United States Patent
Hsu et al.

(10) Patent No.: US 12,001,247 B2
(45) Date of Patent: Jun. 4, 2024

(54) HINGE MECHANISM AND FOLDABLE DEVICE HAVING SAME

(71) Applicant: Google LLC, Mountain View, CA (US)

(72) Inventors: Angus Hsu, Taipei (TW); Dennis Shen, Taipei (TW)

(73) Assignee: Google LLC, Mountain View, CA (US)

( * ) Notice: Subject to any disclaimer, the term of this patent is extended or adjusted under 35 U.S.C. 154(b) by 295 days.

(21) Appl. No.: 17/309,329

(22) PCT Filed: Aug. 25, 2020

(86) PCT No.: PCT/US2020/070456
§ 371 (c)(1),
(2) Date: May 19, 2021

(87) PCT Pub. No.: WO2021/042122
PCT Pub. Date: Mar. 4, 2021

(65) Prior Publication Data
US 2021/0325939 A1    Oct. 21, 2021

Related U.S. Application Data

(60) Provisional application No. 62/892,230, filed on Aug. 27, 2019.

(51) Int. Cl.
*G06F 1/16*     (2006.01)
*H04M 1/02*     (2006.01)

(52) U.S. Cl.
CPC ........ *G06F 1/1681* (2013.01); *H04M 1/0268* (2013.01)

(58) Field of Classification Search
CPC .. G06F 1/1681; G06F 1/1652; H04M 1/0268; H04M 1/0216; E05Y 2900/606
See application file for complete search history.

(56) References Cited

U.S. PATENT DOCUMENTS

| | | | |
|---|---|---|---|
| 3,202,266 A * | 8/1965 | Schmermund | A24B 7/14 131/108 |
| 6,223,393 B1 | 5/2001 | Knopf | |
| 7,209,114 B2 * | 4/2007 | Radley-Smith | H04M 1/0247 345/169 |
| 7,450,107 B2 * | 11/2008 | Radley-Smith | G04G 17/083 63/3 |

(Continued)

FOREIGN PATENT DOCUMENTS

| | | |
|---|---|---|
| EP | 3037911 A1 | 6/2016 |
| TW | M491101 U | 12/2014 |

OTHER PUBLICATIONS

International Search Report and Written Opinion for PCT Application No. PCT/US2020/070456, mailed on Nov. 9, 2020, 11 pages.

(Continued)

*Primary Examiner* — Anthony M Haughton
*Assistant Examiner* — Theron S Milliser
(74) *Attorney, Agent, or Firm* — Shumaker & Sieffert, P.A.

(57) ABSTRACT

A foldable device may include a foldable layer and a hinge mechanism. The hinge mechanism may include a plurality of hinge segments, arranged in a plurality of rows, and with adjacent hinge segments being movably coupled so as to guide a folding and an unfolding motion of the foldable layer.

18 Claims, 17 Drawing Sheets

(56) References Cited

U.S. PATENT DOCUMENTS

| | | | |
|---|---|---|---|
| 8,149,212 B2 * | 4/2012 | Radley-Smith | G04G 17/083 345/169 |
| 9,013,864 B2 | 4/2015 | Griffin et al. | |
| 9,173,287 B1 * | 10/2015 | Kim | G06F 1/1652 |
| 9,557,772 B1 * | 1/2017 | Xin | G06F 1/1643 |
| 9,811,119 B2 * | 11/2017 | Seo | G06F 1/1641 |
| 10,037,058 B2 * | 7/2018 | Kato | E05D 3/06 |
| 10,274,995 B2 | 4/2019 | Seo et al. | |
| 10,481,640 B2 * | 11/2019 | Kim | G09F 9/301 |
| 10,503,210 B2 * | 12/2019 | Lee | G06F 1/1681 |
| 10,545,535 B2 * | 1/2020 | Xin | G06F 1/1641 |
| 10,893,621 B2 * | 1/2021 | Qin | G09F 9/301 |
| 10,915,139 B2 * | 2/2021 | Park | G06F 1/1641 |
| 11,048,302 B2 * | 6/2021 | Seo | H04M 1/0268 |
| 11,079,807 B1 * | 8/2021 | Robinson | E05D 7/00 |
| 11,459,808 B2 * | 10/2022 | Wu | E05D 11/06 |
| 11,503,728 B2 * | 11/2022 | Sun | E05D 3/122 |
| 11,567,542 B2 * | 1/2023 | Miller | G06F 1/1669 |
| 2003/0030595 A1 * | 2/2003 | Radley-Smith | G04G 17/083 345/1.3 |
| 2007/0158376 A1 * | 7/2007 | Radley-Smith | G06F 15/0216 224/219 |
| 2009/0251419 A1 * | 10/2009 | Radely-Smith | G06F 1/163 345/169 |
| 2015/0055287 A1 * | 2/2015 | Seo | G06F 1/1641 361/679.27 |
| 2016/0202736 A1 | 7/2016 | Huang et al. | |
| 2017/0023976 A1 * | 1/2017 | Xin | G06F 1/1618 |
| 2017/0023977 A1 * | 1/2017 | Xin | G06F 1/1647 |
| 2017/0358636 A1 * | 12/2017 | Kim | H10K 50/84 |
| 2018/0024593 A1 * | 1/2018 | Seo | G06F 1/1679 361/679.21 |
| 2018/0059740 A1 * | 3/2018 | Kato | G06F 1/1681 |
| 2018/0092223 A1 | 3/2018 | Hsu | |
| 2018/0150107 A1 * | 5/2018 | Lee | H04M 1/0218 |
| 2019/0345748 A1 * | 11/2019 | Liao | G06F 1/163 |
| 2020/0042042 A1 * | 2/2020 | Park | H10K 77/111 |
| 2020/0221584 A1 * | 7/2020 | Qin | G09F 9/301 |
| 2020/0301480 A1 * | 9/2020 | Miller | E05D 11/082 |
| 2021/0030122 A1 * | 2/2021 | Wu | A44C 5/0053 |
| 2021/0030123 A1 * | 2/2021 | Wu | H04M 1/0268 |
| 2021/0034108 A1 * | 2/2021 | Liao | H04M 1/0268 |
| 2021/0037664 A1 * | 2/2021 | Sun | H05K 5/0226 |
| 2021/0093054 A1 * | 4/2021 | Wu | H04M 1/0247 |
| 2021/0311525 A1 * | 10/2021 | Seo | H04M 1/0268 |
| 2023/0016073 A1 * | 1/2023 | Sun | G06F 1/1615 |

OTHER PUBLICATIONS

International Preliminary Report on Patentability from International Application No. PCT/US2020/070456 dated Mar. 1, 2022, 7 pp.

Response to Communication Pursuant to Rules 161(1) and 162 EPC dated Dec. 3, 2021, from counterpart European Application No. 20768485.3, filed Apr. 29, 2022, 23 pp.

* cited by examiner

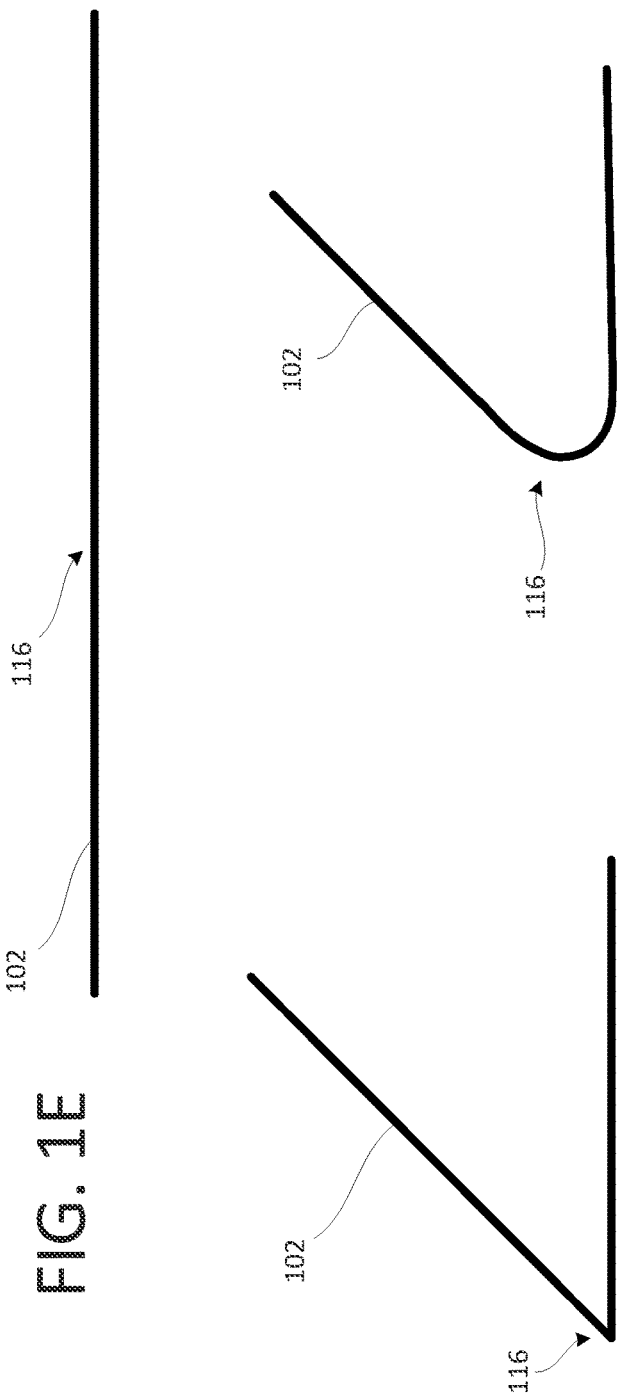
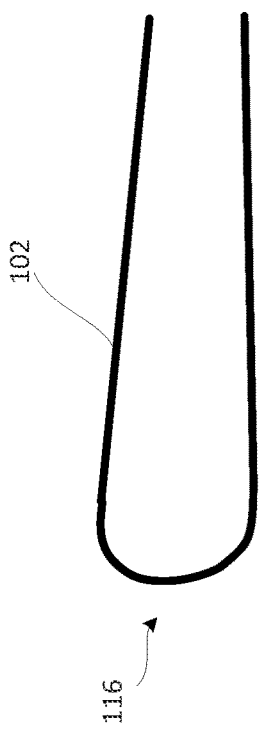

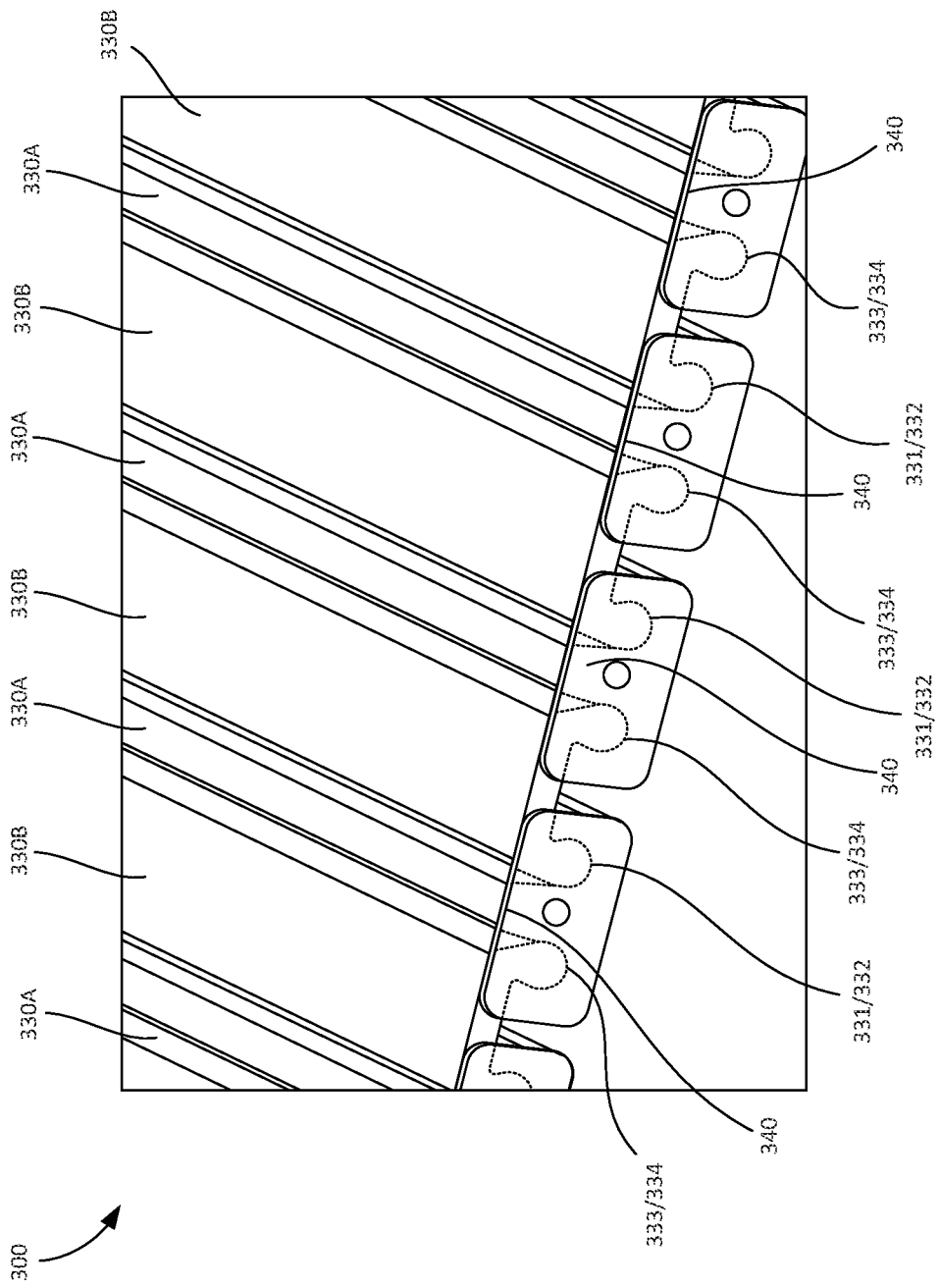

HINGE MECHANISM AND FOLDABLE DEVICE HAVING SAME

CROSS REFERENCE TO RELATED APPLICATION

This application claims priority to U.S. Application No. 62/892,230, filed on Aug. 27, 2019, the disclosure of which is incorporated by reference herein in its entirety.

TECHNICAL FIELD

This description relates, generally, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, device including a flexible, or foldable, display, may enhance the capabilities of a computing device, in that, in a folded configuration, the device may have a relatively small form factor, and in an unfolded configuration, the device may take advantage of a relatively large display area. Mechanisms guiding and supporting the folding and unfolding of a device including a foldable display portion may be relatively complex, and susceptible to failure. These complex mechanisms may produce a somewhat artificial folding motion, and may introduce stress and/or impact on the display portion of the foldable device, thus damaging components of the display portion of the foldable device. Flexible support in a bending area of the display portion of the foldable device may provide a more natural folding motion, may maintain a desired contour, or curvature, of the display portion in the folded configuration, and a desired flatness in the unfolded configuration, and may prevent damage due to excessive compression and/or tension exerted on components of the display portion.

SUMMARY

In a general aspect, a hinge mechanism may include a plurality of hinge units arranged in a respective plurality of rows, each hinge unit being coupled to an adjacent hinge unit of the plurality of hinge units, each hinge unit of the plurality of hinge units including a first hinge segment movably coupled to a second hinge segment. In some implementations, each first hinge segment may include a main body, a first recess formed in the main body, a second recess formed in the main body, and a central wall positioned between the first recess and the second recess. In some implementations, each second hinge segment may include a main body, a first protrusion formed at a first end portion of the main body, and a second protrusion formed at a second end portion of the main body. The first protrusion may be movably received in the first recess, and the second protrusion may be movably received in the second recess, so as to movably couple the first hinge segment and the second hinge segment.

In some implementations, the main body of the first hinge segment is elongated so as to extend longitudinally from a first end portion to a second end portion of a foldable layer of a computing device, and the first recess and the second recess extend longitudinally along the length of the main body of the first hinge segment, from the first end portion to the second end portion of the foldable layer of the computing device. In some implementations, the main body of the second hinge segment is elongated so as to extend longitudinally from the first end portion to the second end portion of the foldable layer of the computing device, and the first protrusion and the second protrusion each extend longitudinally along the length of the main body of the second hinge segment, from the first end portion to the second end portion of the foldable layer of the computing device, such that the first and second hinge segments are movably coupled along a longitudinal length of the first and second hinge segments.

In some implementations, the first hinge segment and the second hinge segment may be rotatable about a central axis of the first protrusion of the second hinge segment rotatably coupled in the first recess of the first hinge segment, and the first hinge segment and the second hinge segment may be rotatable about a central axis of the second protrusion of the second hinge segment rotatably coupled in the second recess of the first hinge segment. In some implementations, the rotation about the central axis of the first protrusion rotatably coupled in the first recess may be independent of the rotation about the central axis of the second protrusion rotatably received in the second recess.

In some implementations, an outer peripheral contour of the first protrusion may be arcuate, and an inner peripheral contour of the first recess may be arcuate, corresponding to the outer peripheral contour of the first protrusion, so as to guide rotational movement of the first protrusion in the first recess. In some implementations, an outer peripheral contour of the second protrusion may be arcuate, and an inner peripheral contour of the first recess may be arcuate, corresponding to the outer peripheral contour of the first protrusion, so as to guide rotational movement of the first protrusion in the first recess. In some implementations, a contact arc between an outer circumferential surface of the first protrusion and an inner circumferential surface of the first recess may be greater than 180 degrees, and a contact arc between an outer peripheral surface of the second protrusion and an inner circumferential surface of the second recess may be greater than 180 degrees.

In some implementations, the hinge mechanism may include a first stopping mechanism configured to restrict rotation of the first and second hinge segments to less than or equal to a previously set maximum bending radius. In some implementations, the first stopping mechanism may include a first stopping surface defined on the main body of the second hinge segment, at a proximal end portion of the first protrusion, and a stopping protrusion formed at an end portion of the main body of the first hinge segment. In an unfolded configuration of the hinge mechanism, the stopping protrusion of the first hinge segment may abut the first stopping surface of the second hinge segment, so as to limit further rotation of the first and second hinge segments in a first direction. In some implementations, the hinge mechanism may include a second stopping mechanism configured to restrict rotation of the first and second hinge segments to greater than or equal to a previously set minimum bending radius. In some implementations, the second stopping mechanism may include a second stopping surface defined on the main body of the second hinge segment, at a distal end portion of the first protrusion, and a stopping surface defined on the central wall of the first hinge segment facing the second stopping surface. In a folded configuration of the hinge mechanism, the second stopping surface of the second hinge segment abuts the stopping surface defined on the central wall of the first hinge segment, so as to limit further rotation of the first and second hinge segments in a second direction.

In some implementations, each hinge unit of the plurality of hinge units may include a first cap coupled to a first end of the first hinge segment, and second cap coupled to a second end of the first hinge segment, so as to retain the first and second protrusions in the first and second recesses.

Implementations can include one or more of the following features, in isolation, or in any combination with each other.

BRIEF DESCRIPTION OF THE DRAWINGS

FIGS. 1E-1H illustrate folding of the exemplary foldable display of the exemplary computing device shown in FIGS. 1A-1D.

FIGS. 4A-4C are schematic views of an exemplary hinge mechanism of the exemplary computing device shown in FIGS. 2A through 3C, in accordance with implementations described herein.

DETAILED DESCRIPTION

A computing device including a hinge mechanism, in accordance with implementations as described herein, may provide a relatively simple, and a relatively reliable, mechanism to support and guide the folding and the unfolding of a foldable display of the computing device, using a relatively natural folding and unfolding motion. In some implementations, the hinge mechanism may maintain the foldable display within allowable bending radius limits in the folded configuration of the computing device. For example, in some implementations, the hinge mechanism may restrict, or limit an amount of bending of a bendable section of the foldable display. In some implementations, the hinge mechanism may maintain a desired degree of planarity of the foldable display in the unfolded configuration of the computing device. In some implementations, the hinge mechanism may restrict, or limit, movement or bending of the bendable section of the foldable display. For example, in some implementations, the hinge mechanism may restrict, or limit movement of the bendable section of the foldable display to approximately 180 degrees, to maintain planarity of the foldable display in the bendable section. In some implementations, the hinge mechanism may restrict, or limit the foldable display from bending beyond approximately 180 degrees. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, without the use of complex gearing and sliding devices, while still providing support to the foldable display, and while still maintaining the foldable display within allowable bending radius limits.

Figure 1A:
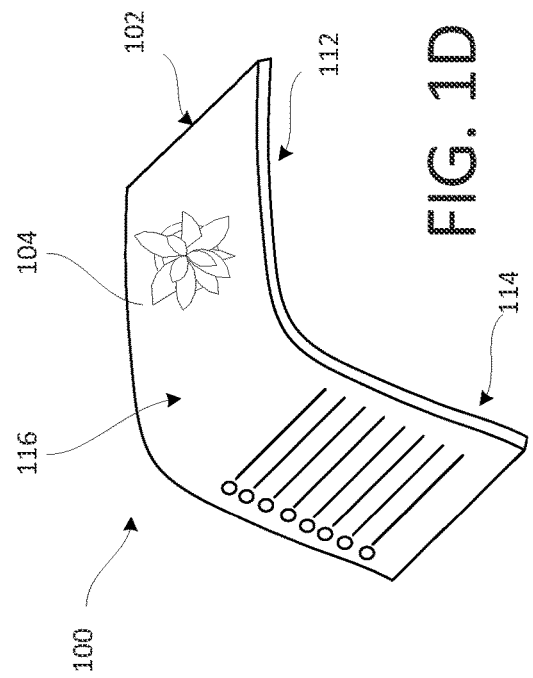
FIGS. 1A-1D illustrate an exemplary computing device including an exemplary foldable display.
Figure 1C:
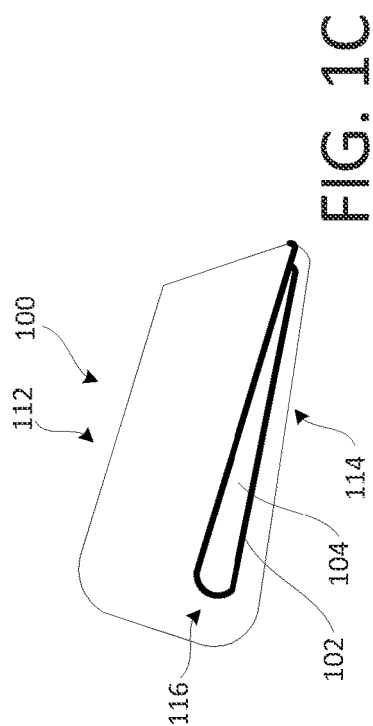
Figure 1B:
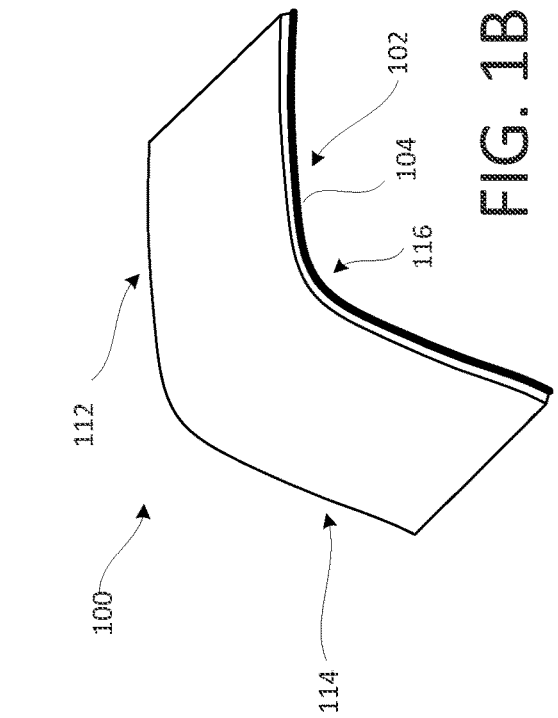
Figure 1D:
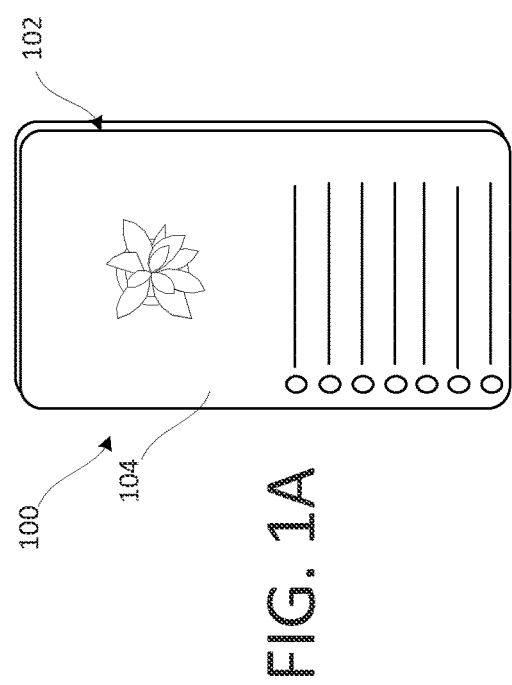

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first section 112 and a second section 114. The first section 112 may be relatively flat, relatively rigid, or semi-rigid. The second section 114 may be relatively flat, relatively rigid, or semi-rigid. A foldable portion or bendable section 116 may be positioned between the first section 112 and the second section 114. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, the hinge mechanism may prevent the foldable display 102 from bending beyond a minimum bending radius, for example, in the folded configuration (e.g., less than 10 millimeters, less than 5 millimeters, or less than 2 millimeters). In some implementations, the hinge mechanism may prevent the foldable display 102 from bending beyond a maximum bending radius, for example, in the unfolded configuration.

FIG. 1E illustrates the exemplary foldable display 102 (of the exemplary computing device 100 shown in FIGS. 1A-1D) in the unfolded configuration. As shown in FIG. 1F, without a hinge mechanism, in accordance with implementations described herein, in place at the bendable section 116 of the foldable display 102, the foldable display 102 may be excessively bent (for example, at an acute angle), or creased, or crimped, and the like, at the bendable section 116. For example, without a hinge mechanism, in accordance with implementations described herein, the foldable display 102 may be bent at the bendable section 116 beyond a minimum allowable bending radius for the foldable display 102. This excessive bending may damage fragile components of the foldable display 102 by, for example, putting components at an inside surface of the crease in the foldable display 102 in compression (i.e., excessive compression, or compression beyond allowable limits) and/or putting components at an outer surface of the crease in the foldable display 102 in tension (i.e., excessive tension, or tension beyond allowable limits). A hinge mechanism, in accordance with implementations described herein, may support and guide the folding and the unfolding of the foldable display 102, and may control, or limit, or restrict a degree of bending in a corresponding section of the foldable display 102, to maintain the foldable display 102 within allowable bending limits, as illustrated in the partially folded configuration shown in FIG. 1G, and the fully folded configuration shown in FIG. 1H.

Figure 2A:
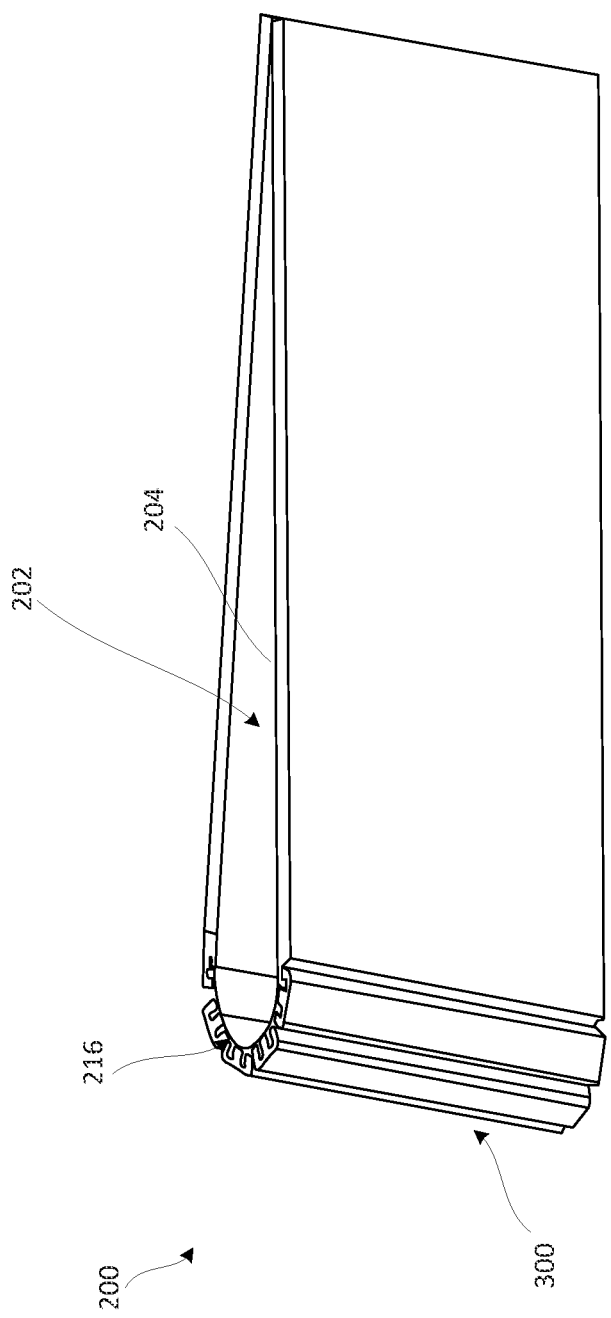
FIG. 2A is a perspective view.
Figure 2B:
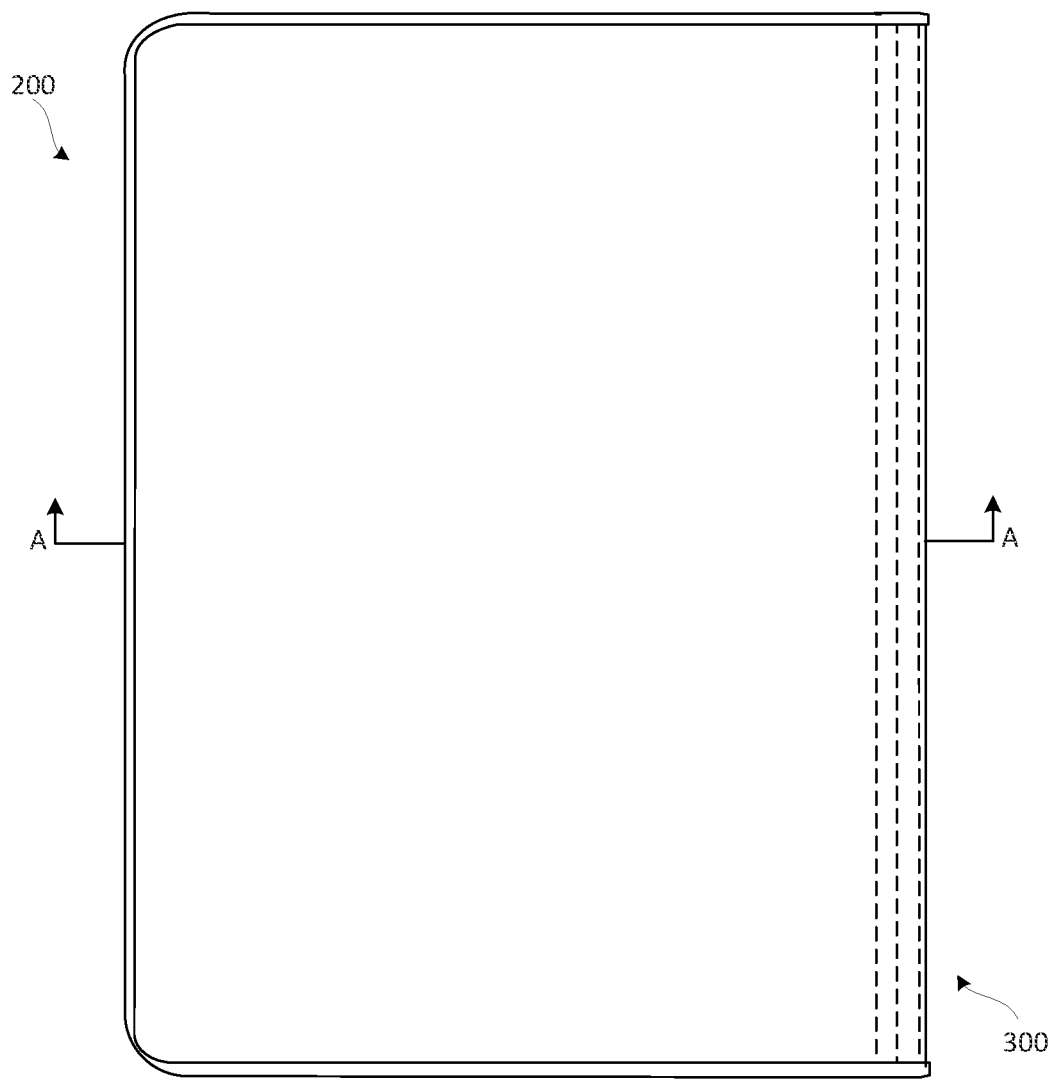
FIG. 2B is a plan view.
Figure 2C:
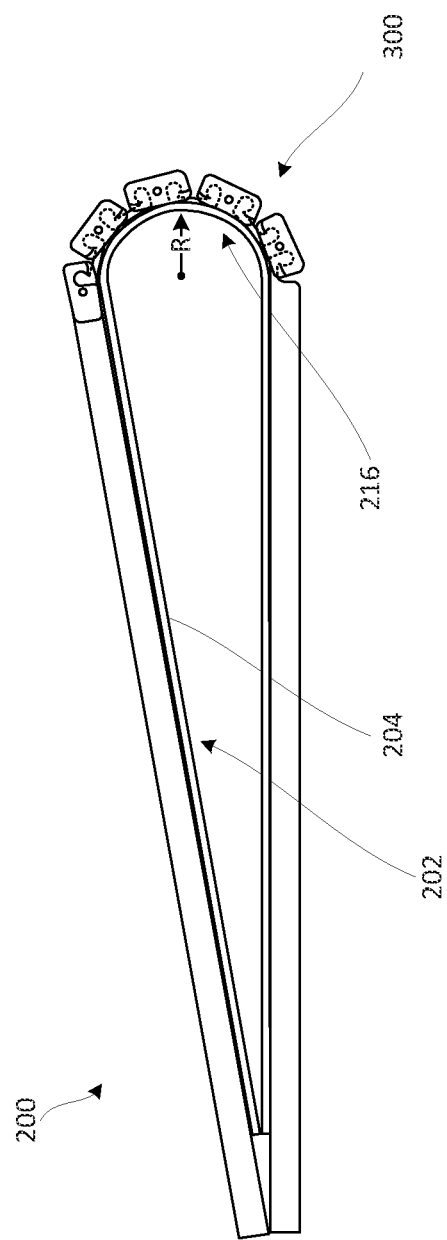
FIG. 2C is a side view, of an exemplary computing device in a folded configuration, in accordance with implementations described herein.
Figure 3A:
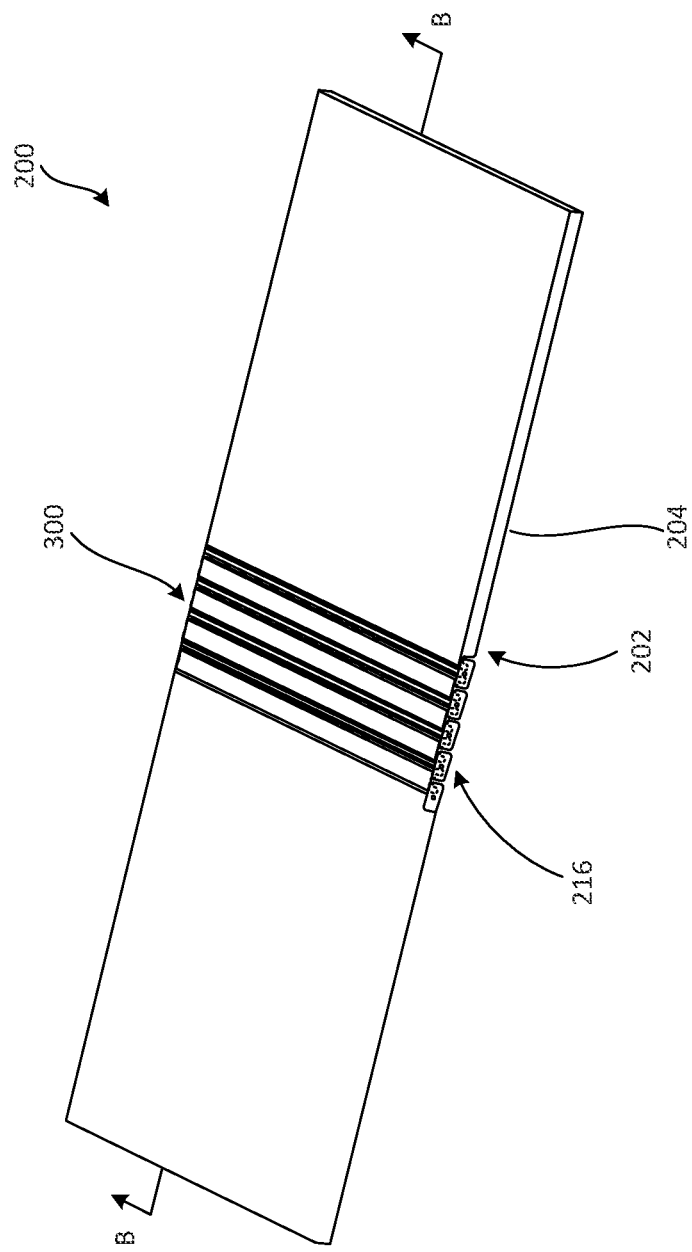
FIG. 3A is a perspective view.
Figure 3B:
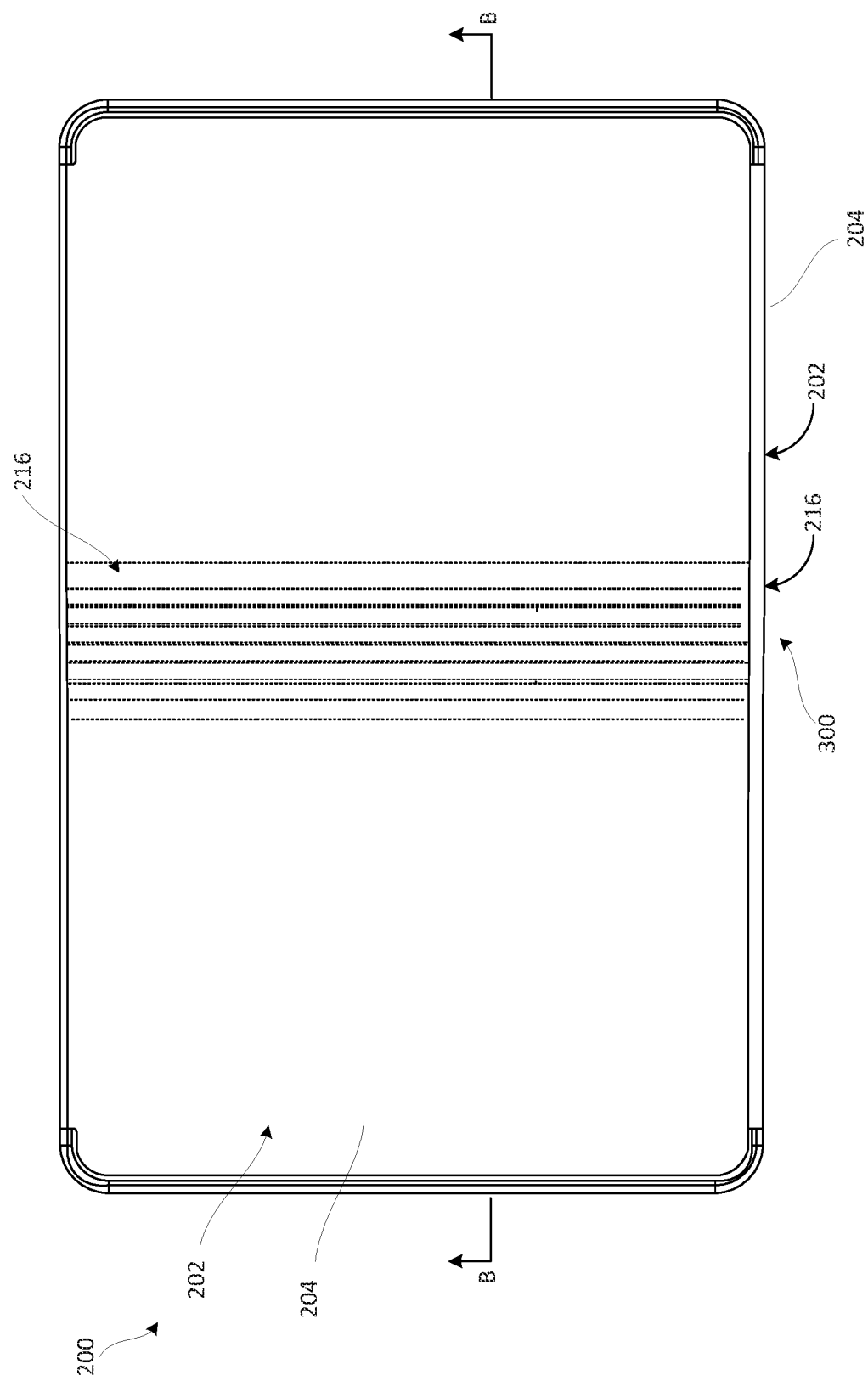
FIG. 3B is a plan view.
Figure 3C:
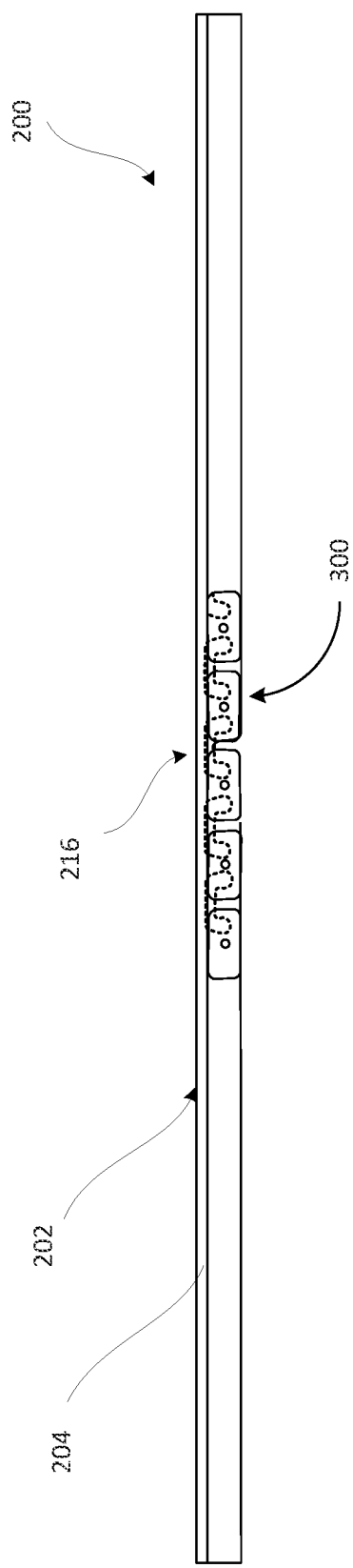
FIG. 3C is a side view, of an exemplary computing device in an unfolded configuration, in accordance with implementations described herein.

FIG. 2A is a perspective view, FIG. 2B is a top view, and FIG. 2C is a side view, of an exemplary computing device 200 including a foldable layer 202, such as, for example, a foldable display 202, in the folded configuration, supported by an exemplary hinge mechanism 300, in accordance with implementations described herein. FIG. 3A is a perspective view, FIG. 3B is a top view, and FIG. 3C is a side view, of the exemplary computing device 200 shown in FIGS. 2A-2C, in the unfolded configuration.

In the example shown in FIGS. 2A through 3C, the foldable display 202 is mounted on the computing device 200 so that a display surface 204 of the foldable display faces inward when the device 200 is in the folded configuration, simply for purposes of discussion and illustration. The principles to be described herein may be applied to other arrangements of the foldable display 202 on the computing device 200. For example, in some implementations, the foldable display 202 may be mounted so that the display surface 204 faces outward when the device 200 is in the folded configuration (not shown).

In the example shown in FIGS. 2A through 3C, the foldable display 202 includes a foldable portion 216, or a bendable section 216, at a position corresponding to a central portion of the computing device 200, simply for purposes of discussion and illustration. In some implementations, the bendable section 216 may be located at positions other than the central portion of the computing device 200, and/or the foldable display 202 can include more bendable sections. In some implementations, the foldable display 202 can be substantially continuously bendable. In the exemplary foldable display 202 shown in FIGS. 2A through 3C, the bendable section 216 allows the foldable display 202 to bend about an axis.

The hinge mechanism 300, in accordance with implementations described herein, may be located in the computing device 200, at a position corresponding to the bendable section 216 of the foldable display 202. The hinge mechanism 300 may support and guide the folding and the unfolding of the foldable display 202. That is, the hinge mechanism 300 may provide for a relatively natural folding and unfolding motion between the folded configuration shown in FIGS. 2A-2C and the unfolded configuration shown in FIGS. 3A-3C. In some implementations, the hinge mechanism 300 may limit, or restrict, an amount of bending or folding in the folded configuration, to prevent the foldable display 202 from bending beyond a minimum bending radius R of the foldable display 202, which may result in damage to fragile components of the foldable display 202. In some implementations, the hinge mechanism 300 may limit, or restrict, an amount of bending or folding in the unfolded configuration, to prevent the foldable display from bending beyond a maximum bending radius of the foldable display 202 in the unfolded configuration.

Figure 4A:
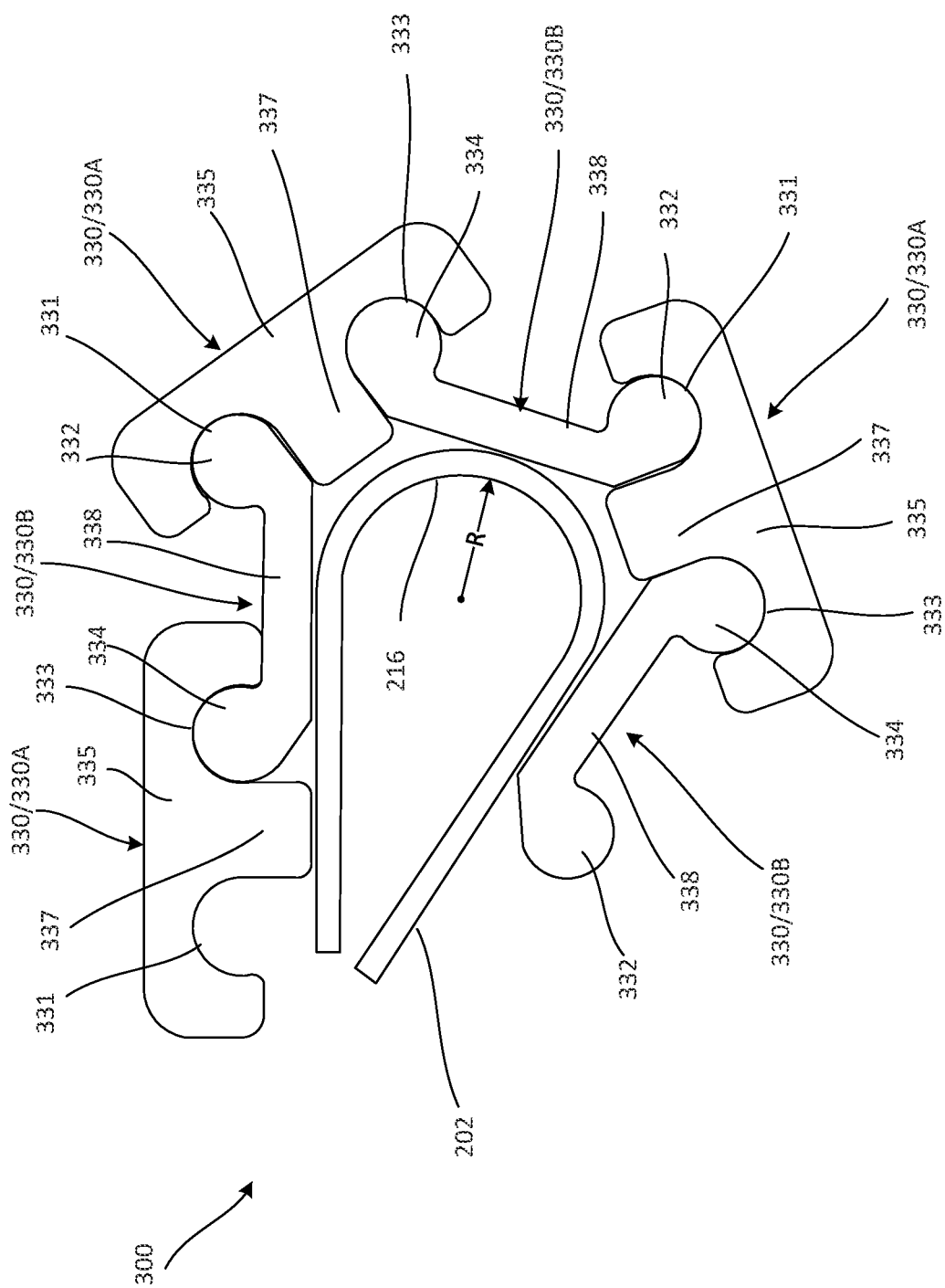
Figure 4B:
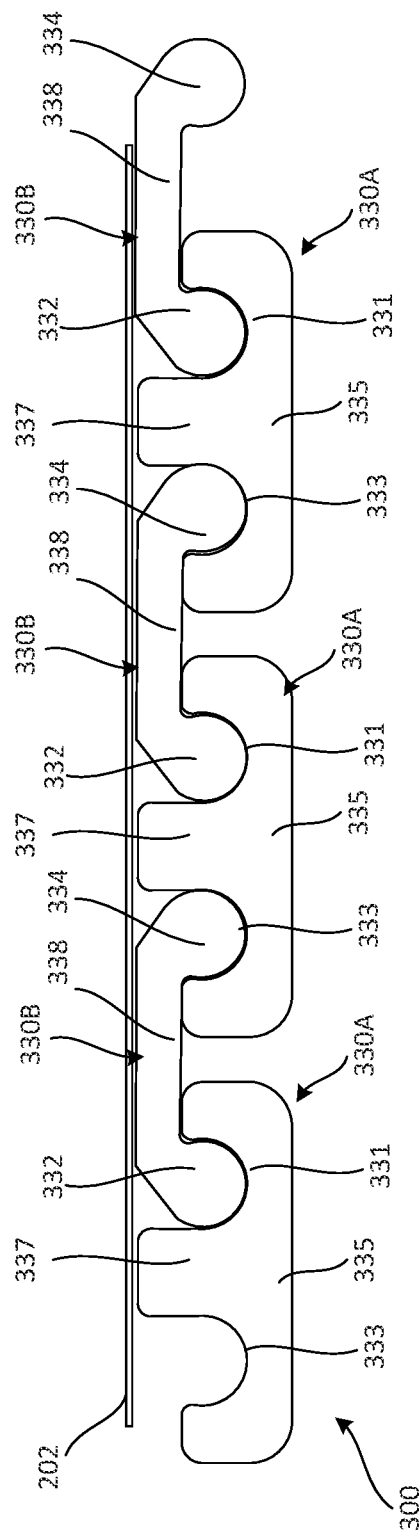

FIG. 4A is a schematic, partial cross-sectional view of the exemplary hinge mechanism 300 of the exemplary computing device 200 shown in FIGS. 2A through 3C, taken along line A-A of FIG. 2B. FIG. 4B is a schematic, partial cross-sectional view of the exemplary hinge mechanism 300 of the exemplary computing device 200 shown in FIGS. 2A through 3C, taken along line B-B of FIG. 3B, in accordance with implementations described herein. FIG. 4C is a perspective view of the hinge mechanism 300 in the unfolded configuration, illustrating a plurality of elongated hinge segments of the hinge mechanism 300. In FIG. 4A, the cross-sectional view of the exemplary hinge mechanism 300 is in the folded configuration of the hinge mechanism 300/foldable display 202/computing device 200 shown in FIGS. 2A-2C. In FIG. 4B, the cross-sectional view of the exemplary hinge mechanism 300 is in the unfolded configuration of the hinge mechanism 300/foldable display 202/ computing device 200 shown in FIGS. 3A-3C.

The hinge mechanism 300 may include a plurality of elongated hinge segments 330, or links 330. The plurality of elongated hinge segments 330, or links 330, may be longitudinally arranged, side by side, in a row, in a portion of the computing device 200 corresponding to the bendable section 216 of the foldable display 202. In some implementations, each hinge segment 330 of the plurality of hinge segments 330 may be movably coupled, or engaged with, or linked with, an adjacent hinge segment 330, allowing for relative movement of the plurality of hinge segments 330 as the computing device 200/foldable display 202 is folded and unfolded. That is, the relative movement provided by this movable coupling of the plurality of hinge segments 330 may support and guide the foldable display 202 as the computing device 200 is moved between the folded configuration shown in FIGS. 2A-2C and the unfolded configuration shown in FIGS. 3A-3C.

As shown in FIGS. 4A and 4B, in some implementations, the hinge mechanism 300 may include a plurality of hinge units, sequentially coupled to form a chain, the chain defining the hinge mechanism 300. In some implementations, the hinge mechanism 300 may include a plurality of first hinge segments 330A movably coupled with a respective plurality of second hinge segments 330B. Thus, each hinge unit may be defined by an adjacent pair of hinge segments 330 including one first hinge segment 330A coupled to one second hinge segment 330B. For example, in some implementations, the plurality of first hinge segments 330A and the plurality of second hinge segments 330B may be alternately arranged, such that each first hinge segment 330A is movably coupled to an adjacent second hinge segment 330B. In some implementations, the first and second hinge segments 330A and 330B may include physical features that support and guide a desired relative movement of the first and second hinge segments 330A, 330B. In some implementations, physical features of the first and second hinge segments 330A, 330B may restrict, or limit, the relative physical movement of the first and second hinge segments 330A, 330B, so as to maintain the foldable display 202 within allowable bending limits. For example, in some implementations, physical features of the first and second hinge segments 330A, 330B may restrict, or limit, the relative physical movement of the first and second hinge segments 330A, 330B, so as to prevent the foldable display 202 from bending to less than a minimum allowable bending radius (when transitioning to the folded configuration), and/or to prevent the foldable display 202 from bending beyond a maximum allowable bending radius (when transitioning to the unfolded configuration).

In some implementations, each first hinge segment 330A may include a main body 335 having a first recess 331 and a second recess 333 formed therein. A central section 337 may extend between the first and second recesses 331, 333 (i.e., upward in the exemplary orientation shown in FIG. 4B) so as to define corresponding portions of the first and second recesses 331, 333, and/or to separate the first recess 331 and the second recess 333. In some implementations, each second hinge segment 330B may include a main body 338 having a first protrusion 332 formed at a first end portion of the main body 338, and a second protrusion 334 formed at a second end portion of the main body 338. Each first recess 331 formed in the first hinge segment 330A may be configured to receive and engage with a corresponding first protrusion 332 of an adjacent second hinge segment 330B (i.e., an adjacent second hinge segment 330B positioned at a first side of the first hinge segment 330A). Similarly, each second recess 333 formed in the first hinge segment 330A may be configured to receive and engage with a corresponding second protrusion of an adjacent second hinge segment 330B (i.e., a second hinge segment 330B positioned at a second side of the first hinge segment 330A).

Figure 5A:
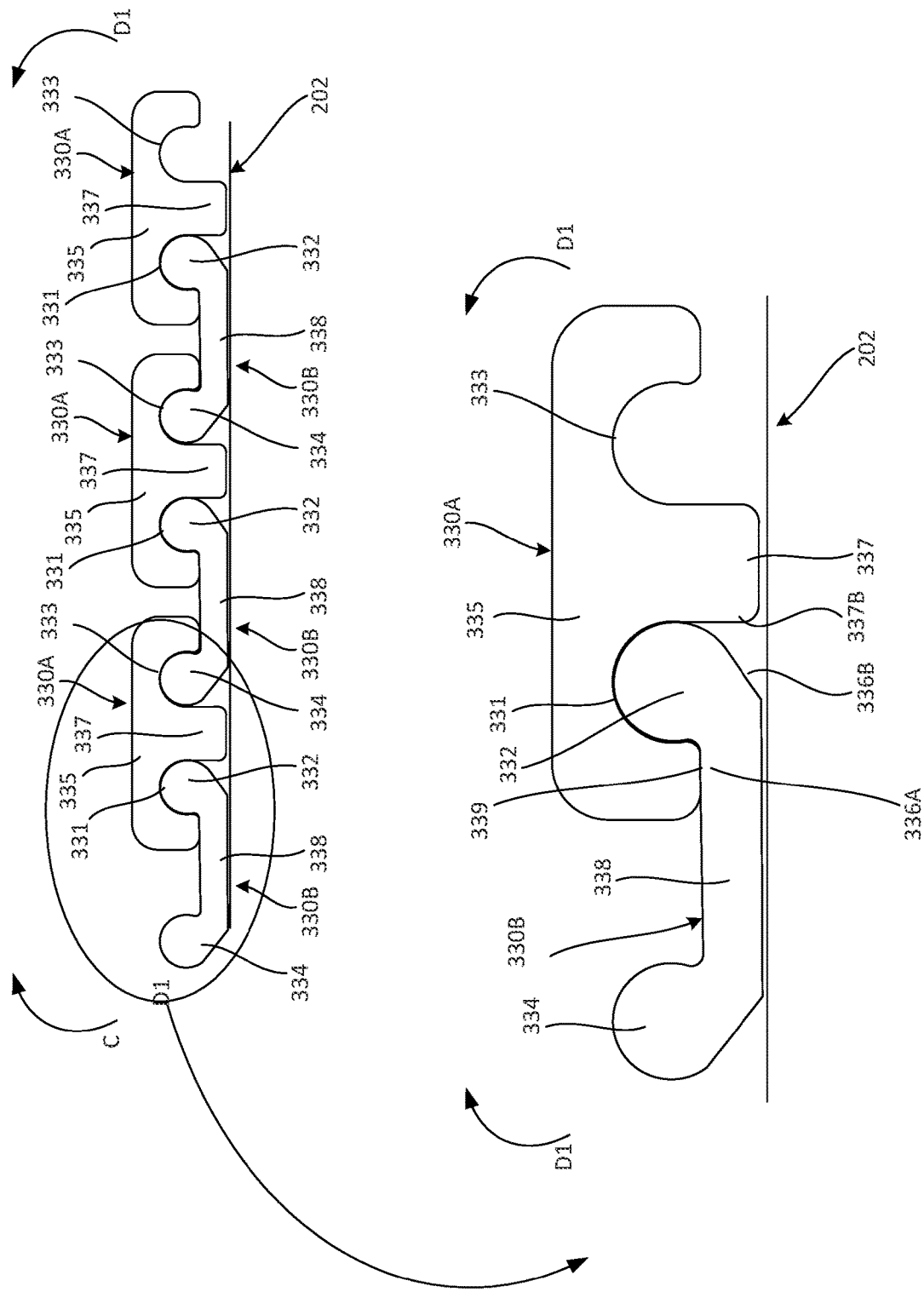
FIGS. 5A-5C illustrate operation of an exemplary hinge mechanism of the exemplary computing device shown in FIGS. 2A through 3C, in accordance with implementations described herein.
Figure 5B:
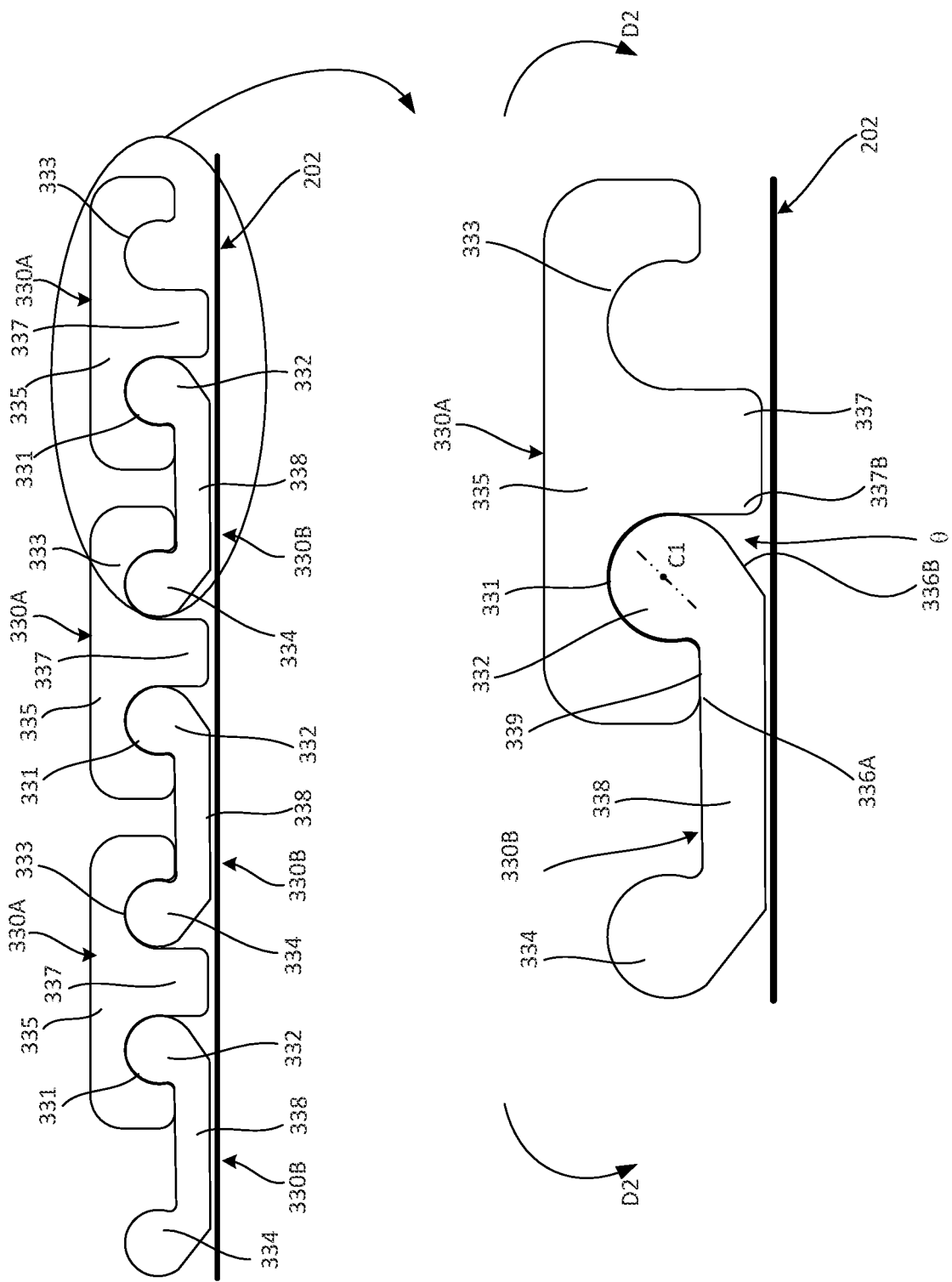

FIGS. 5A and 5B illustrate an exemplary first hinge segment 330A engaged with an exemplary second hinge segment 330B, in the unfolded configuration. In this example arrangement, the first protrusion 332 of the second hinge segment 330B is engaged in the first recess 331 of the first hinge segment 330A. As shown in FIG. 5A, in the unfolded configuration, a stopping protrusion 339 of the first hinge segment 330A abuts a first stopping surface 336A of the second hinge segment 330B. The first stopping surface 336A may be defined on a surface of the body 338 extending between the first protrusion 332 and the second protrusion 334 of the second hinge segment 330B. In this example, the first stopping surface 336A is closer to, or proximate, the base of the first protrusion 332, or a proximal end of the first protrusion 332, so as to be selectively engageable with the stopping protrusion 339 of the first hinge segment 330A as the first and second hinge segments 330A, 330B rotate relative to each other. The positioning of the stopping protrusion 339 of the first hinge segment 330A against the first stopping surface 336A of the second hinge segment 330B restricts further rotation of the first hinge segment 330A and/or the second hinge segment 330B in the direction of the arrows D1. That is, the positioning of the stopping protrusion 339 of the first hinge segment 330A against the first stopping surface 336A of the second hinge segment 330B prohibits further rotation, or unfolding, of the foldable display 202 beyond approximately 180 degrees, thus preventing damage to fragile components of the foldable display 202 due to excessive compression and/or tension beyond allowable limits.

Figure 5C:
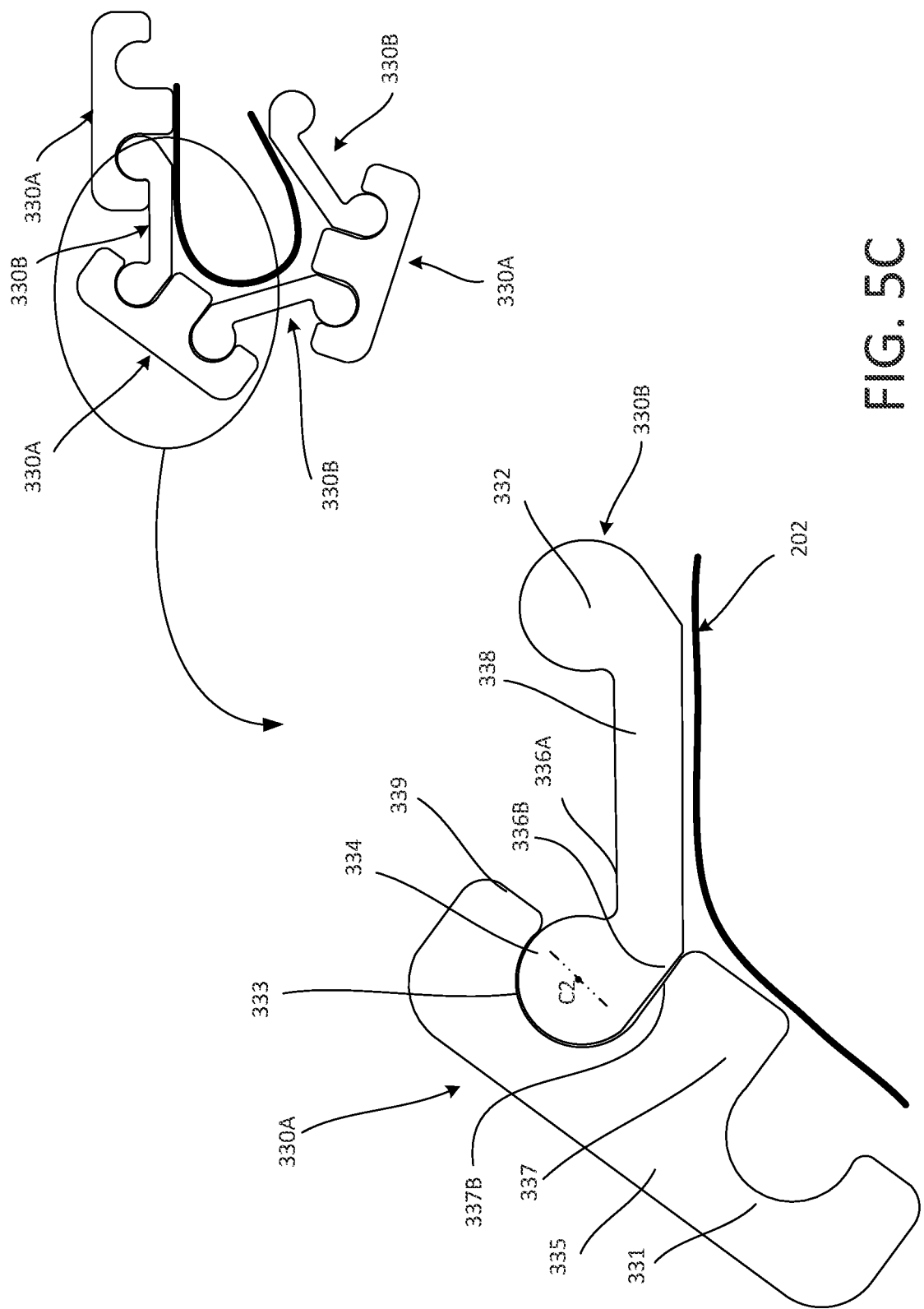

The first and second hinge segments 330A, 330B may be moved, or rotated, relative to each other, in the direction of the arrows D2 shown in FIG. 5B, to move the first and second hinge segments 330A, 330B from the unfolded configuration shown in FIG. 5A to the folded configuration shown in FIG. 5C, to support the folded configuration of the computing device 200. In the rotated (folded) configuration shown in FIG. 5C, a second stopping surface 336B of the second hinge segment 330B abuts a corresponding central stopping surface 337B of the central section 337 of the first hinge segment 330A. The positioning of the second stopping surface 336B of the second hinge segment 330B against the central stopping surface 337B of central section 337 of the first hinge segment 330A restricts further rotation of the first hinge segment 330A and/or the second hinge segment 330B in the direction of the arrows D2. That is, the positioning of the second stopping surface 336B of the second hinge segment 330B against the central stopping surface 337B of the central section 337 of the first hinge segment 330A prohibits further rotation, or folding, of the foldable display 202, to a bending radius that is less than a minimum allowable bending radius of the foldable display 202, thus preventing damage to fragile components of the foldable display 202 due to excessive compression and/or tension beyond allowable limits.

The first and second stopping mechanisms have been described above with respect to FIGS. 5A and 5B, using the interaction of the first protrusion 332 in the first recess 331 for purposes of discussion and illustration. It is understood that similar structure, and similar interaction, between the second protrusion 334 in the second recess 333, may define the first and second stopping mechanism as described above and shown in FIG. 5C.

In some implementations, the outer peripheral shape, or contour, of each first protrusion 332 of each second hinge segment 330B may correspond to the inner peripheral shape, or contour, of the corresponding first recess 331 of the respective first hinge segment 330A in which it is received. Similarly, in some implementations, the outer peripheral shape, or contour, of each second protrusion 334 of each second hinge segment 330B may correspond to the inner peripheral shape, or contour, of the corresponding second recess 333 of the respective first hinge segment 330A in which it is received. This may facilitate the relative rotational movement of the first and second hinge segments 330A, 330B as described above. For example, in some implementations, a mating portion of the first protrusion 332 of the second segment 330B may have a substantially arcuate, or circular, outer peripheral shape or contour, corresponding to a substantially arcuate, or circular, inner peripheral shape or contour of the mating portion of the corresponding first recess 331 of the first segment 330A. Similarly, in some implementations, a mating portion of the second protrusion 334 of the second segment 330B may have a substantially arcuate, or circular, outer peripheral shape or contour, corresponding to a substantially arcuate, or circular, inner peripheral shape or contour of the mating portion of the corresponding second recess 333 of the first segment 330A. In this manner, the first protrusion 332 coupled in the first recess 331 may define a first hinging point, or a first pivoting point, and the second protrusion 334 coupled in the second recess 333 may define a second hinging point, or a second pivoting point.

Figure 6:
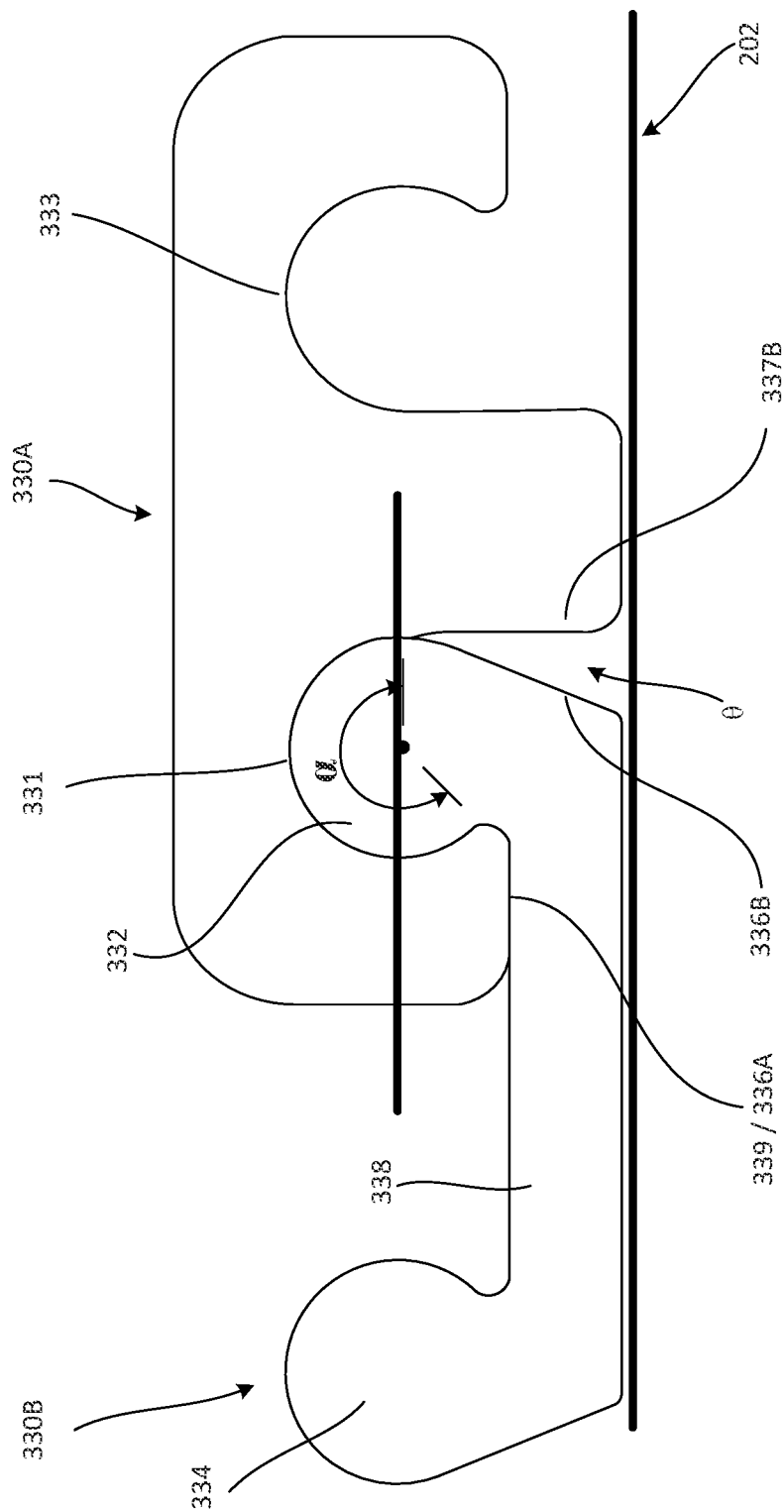
FIGS. 6 and 7A-7C illustrate exemplary retention mechanisms of the exemplary hinge mechanism shown in FIGS. 4A-4C, in accordance with implementations described herein.

In some implementations, an angle θ may be formed between the second stopping surface 336B of the second hinge segment 330B and the corresponding stopping surface 337B of the central portion 337 of the first hinge segment 330A in the unfolded configuration, as shown in FIG. 5B and FIG. 6. In some implementations, an outer peripheral shape, or contour, of the first hinge segment 330A and/or the second hinge segment 330B may be defined so as to achieve a desired angle θ between the second stopping surface 336B of the second hinge segment 330B and the corresponding stopping surface 337B of the central portion 337 of the first hinge segment 330A in the unfolded configuration. In some implementations, the angle θ may be based on an allowable bending radius (i.e., an allowable minimum bending radius) of the foldable display 202, a number of hinge segments 330 forming the hinge mechanism 300, and other such factors. Similarly, a crease or crimp free area provided by the hinge mechanism 300 may be adjusted by, for example, adjusting the angle θ between each of the adjacent hinge segments 330 of the hinge mechanism 300, adjusting a number of hinge segments 330 included in the hinge mechanism 300, and the like.

As noted above, the plurality of first hinge segments 330A and the plurality of second hinge segments 330B may be alternately arranged and engaged in this manner, forming a chain defining the hinge mechanism 300. Each engaged pair of adjacent first and second hinge segments 330A, 330B may be pivotable, or rotatable, for example, about a central axis of the respective recess 331/333 and/or protrusion 332/334, to support and guide movement of the foldable display 202 between the folded configuration and the unfolded configuration. For example, adjacent first and second hinge segments 330A, 330B may be rotatable about a first central axis C1 defined by the first protrusion 332 of the second hinge segment 330B received in the first recess 331 of the adjacent first hinge segment 330A (see FIG. 5B). Similarly, adjacent first and second hinge segments 330A, 330B may be rotatable about a second central axis C2 defined by the second protrusion 334 of the second hinge segment 330B received in the second recess 333 of the adjacent first hinge segment 330A (see FIG. 5C). As noted above, in the unfolded configuration, a first stopping mechanism (including the stopping protrusion 339 of each first hinge segment 330A positioned against the stopping surface 336 of the respective second hinge segment 330B) restricts rotation of the plurality of first hinge segments 330A and/or the plurality of second hinge segments 330B beyond the maximum allowable bending radius of the foldable display 202. In the folded configuration, a second stopping mechanism (including second stopping surface 336B of each second hinge segment 330B positioned against the central portion 337 of the respective first hinge segment 330A) restricts rotation of the plurality of first hinge segments 330A and/or the plurality of second hinge segments 330B beyond the minimum allowable bending radius of the foldable display 202.

As noted above, a mating portion of the first and second protrusions 332, 334 of the second segment 330B may have a substantially arcuate, or circular, outer peripheral shape or contour, corresponding to a substantially arcuate, or circular, inner peripheral shape or contour of the mating portion of the corresponding first and second recesses 331, 333 of the first segment 330A. As shown in FIG. 6, in some implementations, the mating surfaces, or the contact arc, between the protrusions 332, 334 and the recesses 331, 333, respectively, may be great enough to provide for retention of the protrusions 332, 334 in the recesses 331, 333, respectively. For example, in some implementations, the contact arc a between the protrusions 332, 334 and the recesses 331, 333, respectively, may be greater than a half circle, or greater than a semi-circle (i.e., greater than approximately 180 degrees) to provide for retention, for example, rotational retention, of the protrusions 332, 334 in the respective recesses 331, 333.

Figure 7A:
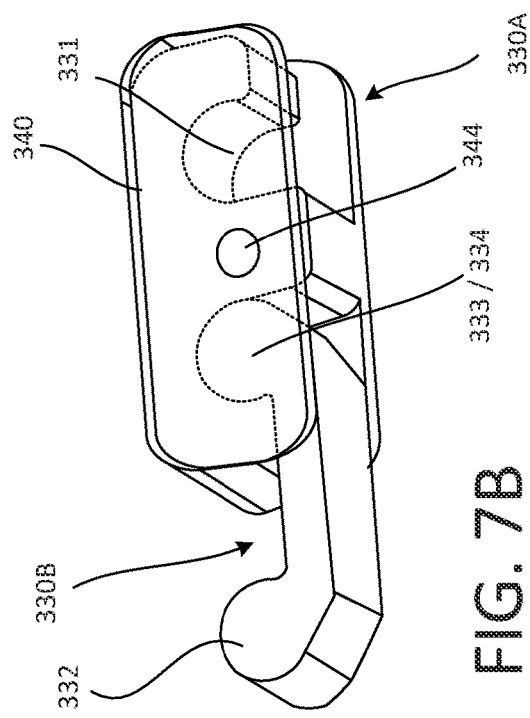
Figure 7B:
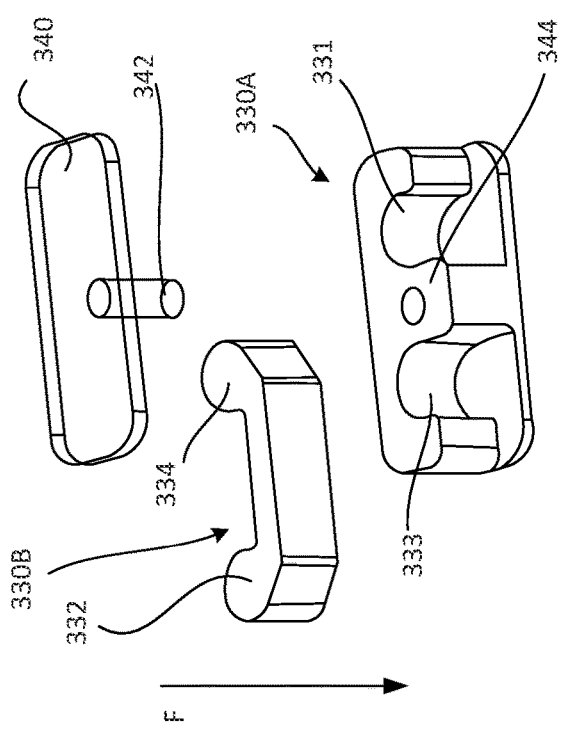

In some implementations, an end cap 340 may be installed at end portions of the plurality of hinge segments 330. The end caps may provide for retention, for example, longitudinal retention, of the protrusions 332, 334 in the respective recesses 331, 333, as shown in FIGS. 4C, 7A and 7B. In some implementations, the second hinge segment 330B may be engaged with the adjacent first hinge segments 330A on each side thereof (i.e., a first adjacent first hinge segment 330A on a first side of the second hinge segment 330B, and a second adjacent hinge segment 330A on a second side of the second hinge segment 330B) by, for example, slidably inserting the first protrusion 332 of the second hinge segment into the first recess 331 of the first adjacent hinge segment 330A, and slidably inserting the second protrusion 334 of the second hinge segment 330B into the second recess 333 of the second adjacent first hinge segment 330A, for example, in the direction of the arrow F, as shown in FIG. 7A. A cap 340 may be installed at one, or both, end portions of the first hinge segment 330A, as shown in FIG. 7B, to retain a longitudinal position of the first and second hinge segments 330A, 330B. In some implementations, the cap 340 may include a pin 342 that is coupled in a corresponding opening 344 formed in the first hinge segment 330A. The pin 342 may be, for example, threadably coupled in the opening 344, or press fit in the opening 344, or may be coupled in other ways.

Figure 7C:
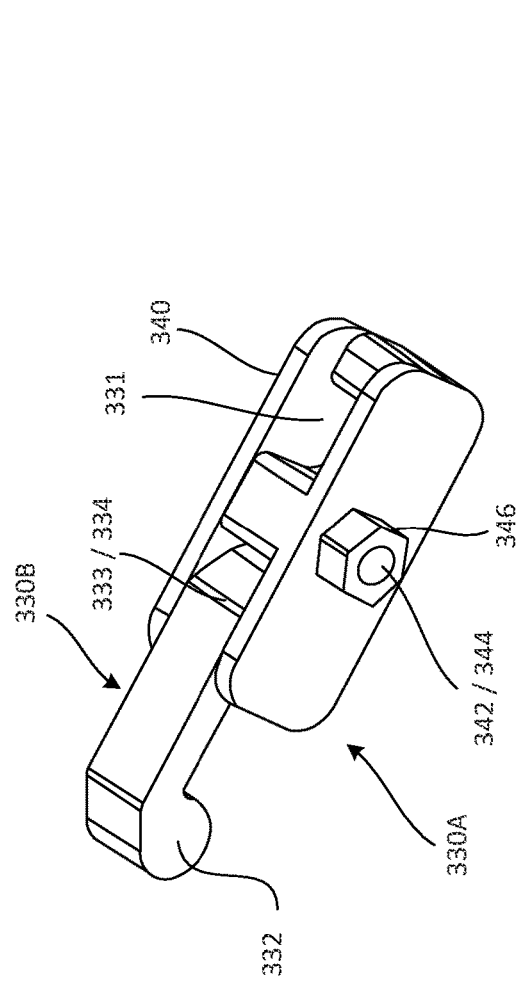
Figure 8:
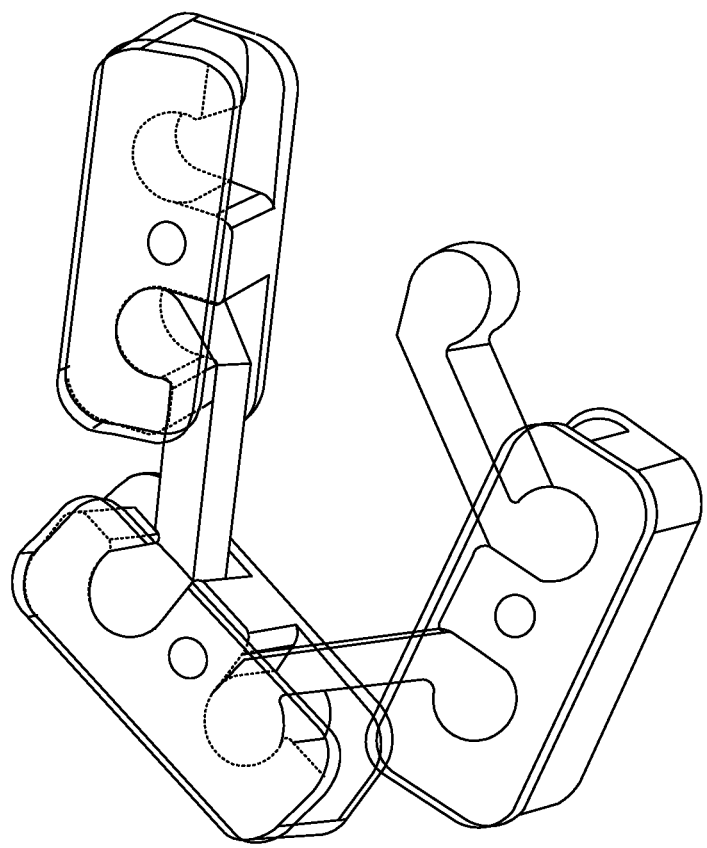
FIG. 8 is a schematic view of an exemplary hinge assembly of an exemplary hinge mechanism of the exemplary computing device shown in FIGS. 2A through 3C, in accordance with implementations described herein.

As described above, in some implementations, the hinge mechanism 300 includes the plurality of elongated hinge segments 330 (i.e., the plurality of elongated first hinge segments 330A rotatably coupled with the plurality of elongated second hinge segments 330B), extending essentially from a first end of the bendable section 216 of the foldable display 202 to a second end of the bendable section 216 of the foldable display 202, as shown in FIGS. 2A-3C. In some implementations, the hinge mechanism 300 may include a plurality of shorter hinge assemblies 380, as shown in FIG. 8. The plurality of hinge assemblies 380 may be intermittently installed at positions in the computing device 200 corresponding to the bendable section 216 of the foldable display 202 to support and guide the folding and the unfolding of the foldable display 202. In some implementations, in which the hinge mechanism 300 includes the plurality of hinge assemblies 380 as shown in FIG. 8, an additional fastening device, such as, for example, a nut 346 may be coupled, for example, threadably coupled, to the pin 342 of the cap 340, to couple the cap to the first hinge segment 330A, as shown in FIG. 7C.

In some implementations, all of the first hinge segments 330A may have substantially the same cross-sectional shape. In some implementations, all of the second hinge segments 330B may have substantially the same cross-sectional shape. In some implementations, a number of hinge segments 330 included in the hinge mechanism 300 and/or the angle θ between the second stopping surface 336B of the second hinge segment 330B and the corresponding surface of the central portion 337 of the first hinge segment 330A, may be determined based on, for example, an allowable size (for example, thickness, transverse dimension, and the like) of the computing device 200, the allowable bending radius R of the foldable display 202, and other such factors. In some implementations, some, or all, of the hinge segments 330 may be made of a relatively rigid material to provide a desired amount of stiffness and/or strength in the hinge segments 330 (and to the hinge mechanism 300), and a desired amount of planarity, or flatness to maintain planarity of the display 202 in the unfolded configuration. For example, in some implementations, the plurality of hinge segments 330 may be made of a stainless steel material, an injection molded liquid metal material, and the like. In some implementations, some, or all, of the plurality of hinge segments 330 may be substantially solid to enhance strength and/or stiffness of the hinge segments 330.

In a computing device including a hinge mechanism, in accordance with implementations described herein, a plurality of hinge segments may be movably coupled, while allowing for rotatable movement of the hinge segments to support and guide the folding and unfolding of the computing device/foldable display.

In a computing device including a hinge mechanism, in accordance with implementations as described herein, a relatively simple, and relatively reliable, hinge mechanism may support the folding and unfolding of a foldable display, with a relatively natural motion, while also providing for planarity of the foldable display in the unfolded configuration, particularly in the bendable section of the foldable display. The hinge mechanism may accomplish this without the use of complicated gearing which adds cost and complexity, which produces a relatively unnatural, restrictive folding and unfolding motion, and which may detract from the utility and reliability of the computing device. This relatively simple and reliable hinge mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism for a computing device, the hinge mechanism comprising:
a plurality of hinge segments, including a plurality of first hinge segments and a plurality of second hinge segments alternately arranged in a row, each of the plurality of hinge segments being movably coupled to an adjacent hinge segment of the plurality of hinge segments, wherein
each first hinge segment includes:
a first recess formed in a main body of the first hinge segment;
a second recess formed in the main body of the first hinge segment; and
a central wall positioned between the first recess and the second recess; and
each second hinge segment includes:
a first protrusion formed at a first end portion of a main body of the second hinge segment, wherein the first protrusion is movably coupled in the first recess of a first hinge segment adjacent to the first end portion of the second hinge segment at which the first protrusion is formed; and a second protrusion formed at a second end portion of the main body of the second hinge segment, wherein the second protrusion is movably received in the second recess of a first hinge segment adjacent to the second end portion of the second hinge segment at which the second protrusion is formed, wherein the hinge mechanism is installed in the computing device at a position corresponding to a bendable section of a foldable display, and wherein the foldable display rests against at least one of the plurality of first hinge segments and against at least one of the plurality of second hinge segments when the computing device is in an unfolded configuration.

2. The hinge mechanism of claim 1, wherein for each first hinge segment of the plurality of first hinge segments, the main body of the first hinge segment is elongated so as to extend longitudinally from a first end portion to a second end portion of a foldable layer of computing device, and the first recess and the second recess extend longitudinally along a length of the main body of the first hinge segment, from the first end portion to the second end portion of the foldable layer of the computing device, and for each second hinge segment of the plurality of second hinge segments, the main body of the second hinge segment is elongated so as to extend longitudinally from the first end portion to the second end portion of the foldable layer of the computing device, and the first protrusion and the second protrusion each extend longitudinally along a length of the main body of the second hinge segment, from the first end portion to the second end portion of the foldable layer of the computing device, and wherein the movable coupling of the first protrusion of each second hinge segment in the first recess of the adjacent first hinge segment, and the movably coupling of the second protrusion of each second hinge segment in the second recess of the adjacent first hinge segment movably couples the plurality of hinge segments along a longitudinal length of the plurality of hinge segments.

3. The hinge mechanism of claim 1, wherein the second hinge segment and the first hinge segment adjacent to the first end portion of the second hinge segment are rotatable about a first central axis defined by the first protrusion of the second hinge segment rotatably coupled in the first recess of the first adjacent hinge segment; and the second hinge segment and the first hinge segment adjacent to the second end portion of the second hinge segment are rotatable about a second central axis defined by the second protrusion of the second hinge segment rotatably coupled in the second recess.

4. The hinge mechanism of claim 3, wherein the rotation about the first central axis of the first protrusion rotatably coupled in the first recess of the first hinge segment adjacent to the first end portion of the second hinge segment is independent of the rotation about the second central axis of the second protrusion rotatably received in the second recess of the first hinge segment adjacent to the second end portion of the second hinge segment.

5. The hinge mechanism of claim 3, wherein an outer peripheral contour of the first protrusion is arcuate, and an inner peripheral contour of the first recess of the first hinge segment adjacent to the first end portion of the second hinge segment is arcuate, corresponding to the outer peripheral contour of the first protrusion, so as to guide rotational movement of the first protrusion in the first recess; and an outer peripheral contour of the second protrusion is arcuate, and an inner peripheral contour of the second recess the first hinge segment adjacent to the second end portion of the second hinge segment is arcuate, corresponding to the outer peripheral contour of the second protrusion, so as to guide rotational movement of the second protrusion in the second recess.

6. The hinge mechanism of claim 5, wherein a contact arc between an outer circumferential surface of the first protrusion and an inner circumferential surface of the first recess of the first hinge segment adjacent to the first end portion of the second hinge segment is greater than 180 degrees; and a contact arc between an outer peripheral surface of the second protrusion and an inner circumferential surface of the second recess of the first hinge segment adjacent to the second end portion of the second hinge segment is greater than 180 degrees.

7. The hinge mechanism of claim 3, further comprising a first stopping mechanism configured to restrict rotation of the plurality of hinge segments in a first direction, the first stopping mechanism including:

a first stopping surface defined on the main body of the second hinge segment, at a proximal end portion of the first protrusion; and a stopping protrusion formed at an end portion of the main body of the first hinge segment adjacent to the first end portion of the second hinge segment, wherein, in an unfolded configuration, the stopping protrusion of the first hinge segment abuts the first stopping surface of the second hinge segment, so as to limit further rotation of the first and second hinge segments in the first direction.

8. The hinge mechanism of claim 7, wherein in the unfolded configuration, the stopping protrusion of the first hinge segments abuts the first stopping surface of the second hinge segment so as to limit relative rotation of the first and second hinge segments to less than or equal to a previously set maximum bending radius.

9. The hinge mechanism of claim 7, further comprising a second stopping mechanism configured to restrict rotation of the plurality of hinge segments in a second direction, the second stopping mechanism including:

a second stopping surface defined on the main body of the second hinge segment, at a distal end portion of the first protrusion; and a central stopping surface defined on the central wall of the first hinge segment adjacent to the first end portion of the second hinge segment, facing the second stopping surface, wherein, in a folded configuration, the second stopping surface of the second hinge segment abuts the central stopping surface defined on the central wall of the first hinge segment, so as to limit further rotation of the first and second hinge segments in the second direction.

10. The hinge mechanism of claim 9, wherein in the folded configuration, the second stopping surface of the second hinge segment abuts the central stopping surface of the first hinge segment so as to limit relative rotation of the first and second hinge segments to greater than a previously set minimum bending radius.

11. The hinge mechanism of claim 3, further comprising a plurality of caps positioned at opposite end portions of the plurality of hinge segments so as to respectively retain the first and second protrusions in the first and second recesses.

12. A foldable device, comprising:
a housing;
a foldable display; and
a hinge mechanism provided in the housing, at a position in the housing corresponding to a bendable section of the foldable device and a bendable section of the foldable display, wherein the hinge mechanism rotatably couples a first portion of the housing and a second portion of the housing, the hinge mechanism including a plurality of longitudinally arranged hinge segments, including a plurality of first hinge segments alternately arranged with a plurality of second hinge segments, each of the plurality of hinge segments being movably coupled to an adjacent hinge segment of the plurality of hinge segments, wherein
each first hinge segment includes:
a first recess formed in a first end portion of a main body of the first hinge segment;
a second recess formed in a second end portion of the main body of the first hinge segment; and
a central wall positioned between the first recess and the second recess; and
each second hinge segment includes:
a first protrusion formed at a first end portion of a main body of the second hinge segment; and
a second protrusion formed at a second end portion of the main body of the second hinge segment;
wherein the first protrusion is configured to be movably received in the first recess of an adjacent first hinge segment, and the second protrusion is configured to be movably received in the second recess of an adjacent first hinge segment; and
wherein the foldable display rests against at least one of the plurality of first hinge segments and against at least one of the plurality of second hinge segments when the foldable device is in an unfolded configuration.

13. The foldable device of claim 12, wherein
a first pivot axis is defined by the first protrusion movably received in the first recess; and
a second pivot axis is defined by the second protrusion movably received in the second recess.

14. The foldable device of claim 13, wherein rotation about the first pivot axis of the first protrusion rotatably coupled in the first recess is independent of rotation about the second pivot axis of the second protrusion rotatably received in the second recess.

15. The foldable device of claim 12, further comprising a first stopping mechanism, including:
a first stopping surface defined on the main body of the second hinge segment, at a proximal end portion of at least one of one of the first protrusion or the second protrusion; and
a stopping protrusion formed at an end portion of the main body of the first hinge segment and configured to selectively abut the first stopping surface based on a relative position of the first hinge segment and the second hinge segment,
wherein, in an unfolded configuration, the stopping protrusion abuts the first stopping surface, so as to limit further rotation of the first and second hinge segments in a first direction.

16. The foldable device of claim 15, wherein the first stopping mechanism is configured to limit relative rotation of the first and second hinge segments to less than or equal to a previously set maximum bending radius.

17. The foldable device of claim 15, further comprising a second stopping mechanism, including:
a second stopping surface defined on the main body of the second hinge segment, at a distal end portion of at least one of the first protrusion or the second protrusion; and
a central stopping surface defined on the central wall of the first hinge segment, facing the second stopping surface,
wherein, in a folded configuration, the second stopping surface of the second hinge segment abuts the central stopping surface defined on the central wall of the first hinge segment, so as to limit further rotation of the first and second hinge segments in a second direction.

18. The foldable device of claim 17, wherein the second stopping mechanism is configured to limit relative rotation of the first and second hinge segments to greater than a previously set minimum bending radius.

* * * * *